United States Patent
Isaji et al.

(10) Patent No.: US 9,988,278 B2
(45) Date of Patent: Jun. 5, 2018

(54) PRODUCTION METHOD FOR FORSTERITE FINE PARTICLES

(71) Applicant: NISSAN CHEMICAL INDUSTRIES, LTD., Tokyo (JP)

(72) Inventors: Tadayuki Isaji, Sodegaura (JP); Takashi Ogihara, Fukui (JP); Takayuki Kodera, Fukui (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 15/109,949

(22) PCT Filed: Mar. 24, 2015

(86) PCT No.: PCT/JP2015/058863
§ 371 (c)(1),
(2) Date: Jul. 6, 2016

(87) PCT Pub. No.: WO2015/146961
PCT Pub. Date: Oct. 1, 2015

(65) Prior Publication Data
US 2016/0332887 A1    Nov. 17, 2016

(30) Foreign Application Priority Data
Mar. 25, 2014    (JP) .................................. 2014-062408

(51) Int. Cl.
*C01B 33/24* (2006.01)
*C01B 33/22* (2006.01)
(Continued)

(52) U.S. Cl.
CPC .............. *C01B 33/22* (2013.01); *C04B 35/20* (2013.01); *C04B 35/64* (2013.01);
(Continued)

(58) Field of Classification Search
CPC ......... C01B 33/22; C04B 35/20; C04B 35/64; C04B 2235/3418; C04B 2235/449; C01P 2004/62; C01P 2004/64; C01P 2235/3418
(Continued)

(56) References Cited

U.S. PATENT DOCUMENTS 4,608,215 A    8/1986 Gonczy et al.

FOREIGN PATENT DOCUMENTS

JP    H07-96165 A    4/1995
JP    2003-002640 A    1/2003
(Continued)

OTHER PUBLICATIONS

Machine translation of JP2003327470 (A)—dated Nov. 19, 2003.*
(Continued)

*Primary Examiner* — Haytham Soliman
(74) *Attorney, Agent, or Firm* — Oliff PLC

(57) ABSTRACT

A method for producing forsterite microparticles having a primary particle size of 1 to 200 nm, as determined through electron microscopy, characterized in that the method includes spray-drying, at 50° C. or higher and lower than 300° C., a solution containing a water-soluble magnesium salt and colloidal silica at a mole ratio of magnesium atoms to silicon atoms (Mg/Si) of 2; and subsequently, firing the spray-dried product in air at 800 to 1,000° C.

6 Claims, 2 Drawing Sheets

Figure 1:
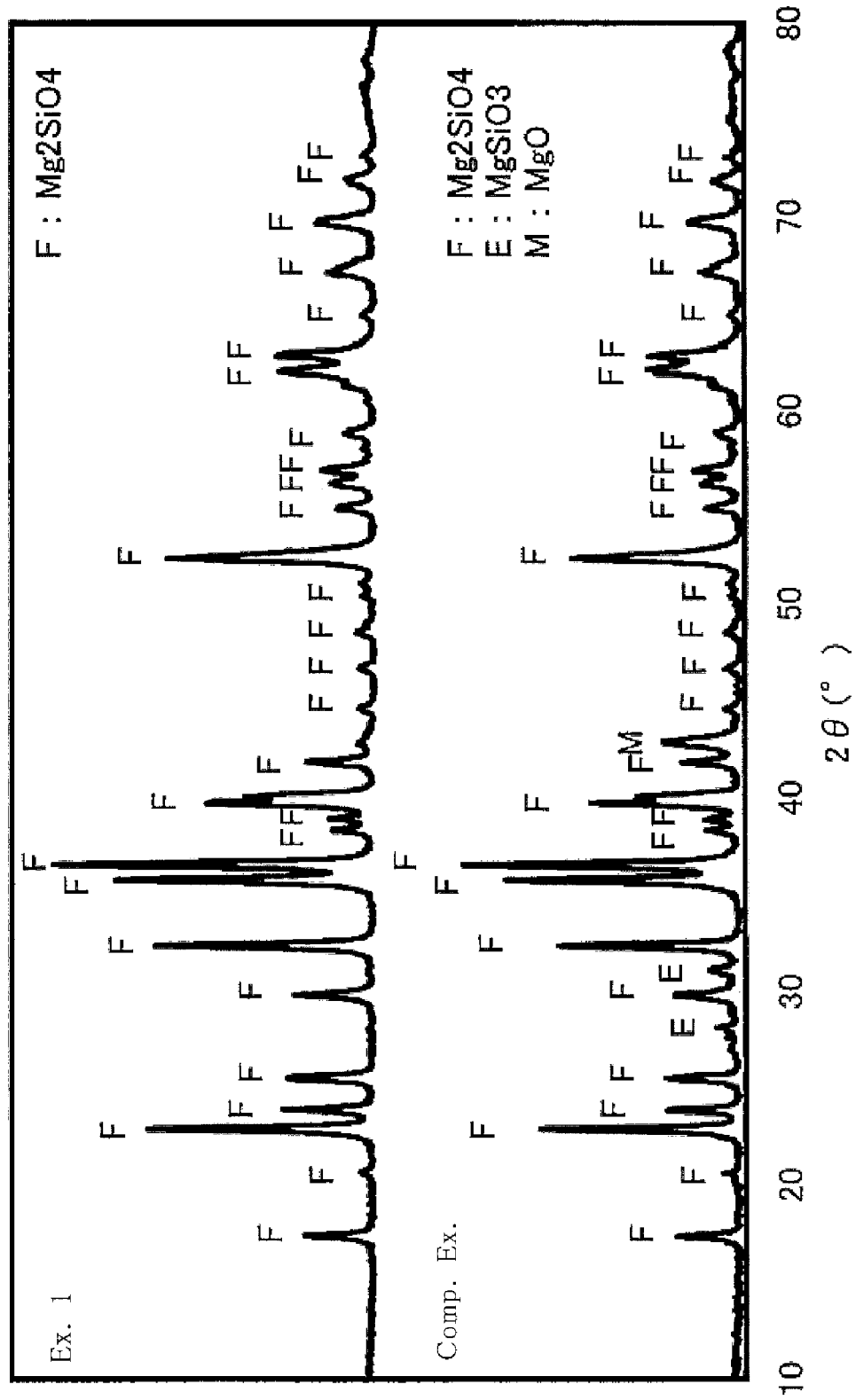

(51) Int. Cl.
*C04B 35/64* (2006.01)
*C04B 35/20* (2006.01)

(52) U.S. Cl.
CPC ...... *C01P 2004/62* (2013.01); *C01P 2004/64* (2013.01); *C04B 2235/3418* (2013.01); *C04B 2235/449* (2013.01)

(58) Field of Classification Search
USPC ........................................................ 423/331
See application file for complete search history.

(56) References Cited

FOREIGN PATENT DOCUMENTS

| | | |
|---|---|---|
| JP | 2003-327470 A | 11/2003 |
| JP | 2007-240825 A | 9/2007 |
| WO | 2007/074606 A1 | 7/2007 |

OTHER PUBLICATIONS

Machine translation of JP2003002640 (A)—dated Jan. 8, 2003.*
Saberi et al. "A novel method to low temperature synthesis of nanocrystalline forsterite" Materials Research Bulletin vol. 42, Issue 4, Apr. 12, 2007, pp. 666-673 (Year: 2007).*
Jun. 9, 2015 International Search Report issued in International Patent Application No. PCT/JP2015/058863.
Douy, A.; "Aqueous Syntheses of Forsterite (Mg2SiO4) and Enstatite (MgSiO3);" Journal of Sol-Gel Science and Technology; 2002; vol. 24; No. 3; pp. 221-228.
Mitchell, M.B.D. et al; "Preparation of forsterite (Mg2SiO4) powders via an aqueous route using magnesium salts and silicon tetrachloride (SiCl4);" Journal of Sol-Gel Science and Technology; 1999; vol. 15; No. 3; pp. 211-219.
Tani, T. et al; "Chromium-Doped Forsterite Nanoparticle Synthesis by Flame Spray Pyrolysis;" Journal of the American Ceramic Society; 2007; vol. 90; No. 3; pp. 805-808.

* cited by examiner

PRODUCTION METHOD FOR FORSTERITE FINE PARTICLES

TECHNICAL FIELD

The present invention relates to a method for producing forsterite in finely divided particle form (hereinafter referred to as forsterite microparticles), which is useful as various ceramics, transparent decorative materials, electronic materials, etc.

BACKGROUND ART

Currently, composite insulating materials formed of a heat-resistant resin (e.g., epoxy resin) including an insulating ceramic material (e.g., silica) in microparticle form added thereto are practically employed as a sealing material for integrated circuits. However, in a trend for enhancement of integration density and capacity, demand has arisen for an insulating material which exhibits low dielectric loss, particularly in a high-frequency region, in order to reduce signal loss.

Among such materials, magnesium silicon oxides such as forsterite ($Mg_2SiO_4$) and enstatite $MgSiO_3$) are known as materials exhibiting small dielectric loss and high insulating property in a high-frequently region, and serve as a dielectric ceramic material for use in a microwave region.

In the case where a magnesium silicon oxide is employed in a translucent composite insulating material, the particle size thereof must be minimized so as to prevent light scattering.

Patent Document 1 discloses a method for producing an MgO—$SiO_2$ oxide powder, which method includes mixing and crushing $Mg(OH)_2$ powder or MgO powder with an $SiO_2$ powder having a mean primary particle size of 10 μm or less in water; spray-drying the mixture; firing the mixture at 1,100° C.; and subjecting the mixture to wet-crushing and spray-drying by means of a spray-drier, to thereby yield an MgO—$SiO_2$ oxide powder having a mean primary particle size of 0.05 to 0.15 μm. However, in this method, the particle size of the product becomes 1 μm or more when wet pulverization is omitted after firing. Thus, the method requires wet pulverization twice in the production steps, making this method cumbersome.

Patent Document 2 discloses a method for producing a forsterite powder, which method includes pyrolyzing a liquid mixture at 900° C. through a spray-pyrolysis technique, wherein the liquid mixture is prepared by mixing aqueous magnesium nitrate solution and ethyl silicate solution so as to adjust the mole ration of magnesium to silicon to 2:1. The thus-produced powder has a mean particle size as large as 0.78 μm. When the powder is used as a filler for a transparent composite insulating material, the transparency of the product is not satisfactory.

Patent Document 3 discloses a method for producing crystalline hollow microbodies, the method including transforming a solution of an inorganic material in a hollow microbody form or a precursor thereof, or a dispersion of the inorganic material or a precursor thereof in a dispersion liquid medium to a micro-drop material; and feeding the inorganic material into a high-temperature atmosphere where the material is sintered or melted. However, the forsterite hollow bodies produced through the above procedure have a particle size as large as 2.4 μm. Thus, even when the hollow bodies are employed as a filler for a transparent composite insulating material, the transparency of the product cannot be sufficiently enhanced.

Patent Document 1: Japanese Patent Laid-Open (kokai) No. 2003-327470
Patent Document 2: Japanese Patent Laid-Open (kokai) No. 2003-2640
Patent Document 3: Japanese Patent Laid-Open (kokai) No. Hei 7-96165

SUMMARY OF THE INVENTION

Problems to be Solved by the Invention

The present invention has been conceived under such circumstances. Thus, an object of the present invention is to provide a method for producing forsterite microparticles having a small particle size, which microparticles are useful for ceramics, transparent decorative materials, electronic parts, etc.; can be used as an insulating material exhibiting low dielectric loss in a high-frequency region particularly suitable for use as an electronic part; and provide enhanced transparency thereof.

Means for Solving the Problems

The present inventors have conducted extensive studies in order to attain the aforementioned object, and have found that forsterite microparticles having a primary particle size of 1 to 200 nm, as determined through electron microscopy, can be produced through spray-drying a solution containing a water-soluble magnesium salt and colloidal silica and subsequently firing the spray-dried product in air at 800 to 1,000° C., without conducting any pulverization step.

Accordingly, the present invention is directed to a method for producing forsterite microparticles which is described in any of the following first to fourth modes.

First mode: a method for producing forsterite microparticles having a primary particle size of 1 to 200 nm, as determined through electron microscopy, characterized in that the method comprises spray-drying a solution containing a water-soluble magnesium salt and colloidal silica at a mole ratio of magnesium atoms to silicon atoms (Mg/Si) of 2 in an atmosphere at 50° C. or higher and lower than 300° C.; and subsequently, firing the spray-dried product in air at 800 to 1,000° C.

Second mode: a method for producing forsterite microparticles as described in the first mode, wherein the colloidal silica has a primary particle size of 2 to 100 nm, as determined through electron microscopy.

Third mode: a method for producing forsterite microparticles as described in the first or second mode, wherein the water-soluble magnesium salt is an organic acid salt of magnesium.

Fourth mode: a method for producing forsterite microparticles as described in the third mode, wherein the magnesium organic acid salt is at least one species selected from the group consisting of magnesium citrate, magnesium glycolate, magnesium malate, magnesium tartrate, magnesium lactate, magnesium malonate, magnesium succinate, and magnesium acetate.

Effects of the Invention

According to the production method of the present invention, there can be readily produced forsterite microparticles having a primary particle size of 1 to 200 nm, as determined through electron microscopy.

The forsterite microparticles produced according to the present invention can enhance the transparency of the microparticles for use as a filler for a composite insulating material and also can be employed as a high-refractive-index coating agent, an anti-reflective agent, and a micro-filler for a composite material such as metal, plastic, or ceramic. When the forsterite microparticles of the present invention are used for producing a sintered dielectric ceramic for use in a microwave region, the sintering temperature can be reduced.

BRIEF DESCRIPTION OF THE INVENTION

FIG. 1 X-ray diffraction patterns of Example 1 and Comparative Example 1.

Figure 2:
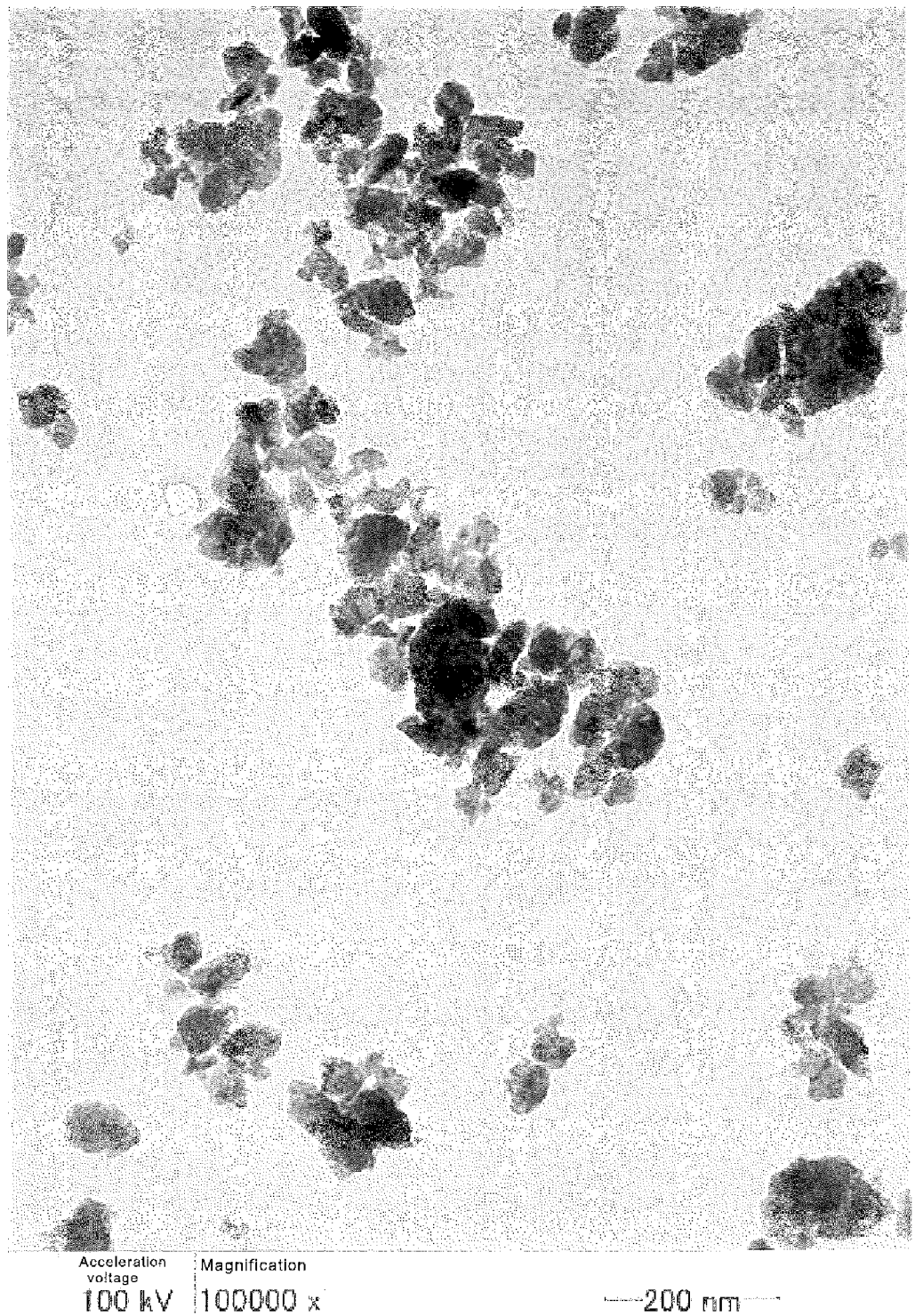

FIG. 2 A TEM image of Example 1.

The present invention is directed to a method for producing forsterite microparticles. In the present invention, no particular limitation is imposed on the method of preparing a solution containing a water-soluble magnesium salt and colloidal silica. Such a water-soluble magnesium salt and colloidal silica may be appropriately mixed together in water through any technique.

The solution containing a water-soluble magnesium salt and colloidal silica has a ratio of magnesium atoms to silicon atoms of 2, as an Mg/Si mole ratio.

In preparation of the solution containing a water-soluble magnesium salt and colloidal silica, the water-soluble magnesium salt may be a powder thereof. However, an aqueous solution thereof is preferably used. No particular limitation is imposed on the solid concentration of the aqueous solution, as reduced to MgO, but it is preferably 1 to 20 masse. The colloidal silica used in the invention is preferably an aqueous dispersion thereof. No particular limitation is imposed on the solid concentration of the aqueous dispersion, as reduced to $SiO_2$, but it is preferably 1 to 40 mass %.

No particular limitation is imposed on the solid concentration of the solution containing a water-soluble magnesium salt and colloidal silica, but it is preferably 1 to 10 mass %, as reduced to $Mg_2SiO_4$, more preferably 2 to 5 mass %.

The water-soluble magnesium salt employed in the present invention is a magnesium salt which can be dissolved in water at 25° C. at a solubility of 1 mass % or higher. Examples of the magnesium salt include inorganic magnesium salts such as magnesium chloride, magnesium nitrate, and magnesium sulfate; and organic magnesium salts such as magnesium citrate, magnesium glycolate, magnesium malate, magnesium tartrate, magnesium lactate, magnesium malonate, magnesium succinate, and magnesium acetate.

Examples of the water-soluble magnesium salt further include water-insoluble magnesium salts such as magnesium hydroxide and magnesium carbonate, which are dissolved in an acid such as hydrochloric acid, nitric acid, sulfuric acid, citric acid, glycolic acid, malic acid, tartaric acid, lactic acid, malonic acid, succinic acid, or acetic acid.

The aforementioned water-soluble magnesium salts may be used singly or in combination or two or more species.

In order to prevent corrosion caused by the gas generated during drying or firing, use of a magnesium organic acid salt is particularly preferred.

No particular limitation is imposed on the colloidal silica used in the present invention. Generally, the primary particle size thereof, as determined through electron microscopy, is 1 to 1,000 nm, preferably 2 to 100 nm. No particular limitation is imposed on the colloidal silica production method. For example, there may be used a commercial product of colloidal silica, which is produced through a technique including growth of colloid particles from water glass as a raw material, a procedure including hydrolysis a silicon alkoxide and subsequent particle growth, or a similar technique.

Colloidal silica is generally available in the form of water dispersion, which is an aqueous silica sol commercial product (e.g., SNOWTEX (registered trademark) OXS, SNOWTEX O, or SNOWTEX 30). Also, a dispersion of colloidal silica in organic solvent is commercially available as an organo-silica sol. Examples of dispersion media of the organo-silica sol include methanol, isopropanol, ethylene glycol, methyl ethyl ketone, methyl isobutyl ketone, and ethyl acetate.

Preferably, the prepared solution containing a water-soluble magnesium salt and colloidal silica at a mole ratio of magnesium atoms to silicon atoms (Mg/Si) of 2 is dried so that the water-soluble magnesium salt and colloidal silica are in a uniformly mixed state. The drying may be carried out by means of a spray drier, a drum drier, a vacuum drier, a freeze drier, or the like. Among these drying means, a spray drier is particularly preferably employed, since it allows drying while a uniform mixture state in the solution is maintained.

The temperature of the drying atmosphere is 50° C. or higher and lower than 300° C. The temperature is preferably not higher than the decomposition temperature of the water-soluble magnesium salt employed or colloidal silica employed.

The thus-dried powder is fired in air at 800 to 1,000° C. The firing time is 0.5 to 50 hours, preferably 1 to 20 hours. In the case where the temperature of the firing atmosphere is higher than 1,000° C., the formed forsterite particles have a primary particle size greater than 200 nm. In such a case, difficulty is encountered in enhancing the transparency of the particles when they are used as a filler for a composite insulating material. When the temperature of the firing atmosphere is lower than 800° C., the water-soluble magnesium salt does not sufficiently react with colloidal silica, thereby failing to yield forsterite particles. Both cases are not preferred.

As used herein, the term "the primary particle size thereof, as determined through electron microscopy" refers to the particle size of each microparticle which is determined through observation under a transmission electron microscope.

EXAMPLES

The present invention will next be described in detail by way of the Examples and Comparative Examples, which should not be construed as limiting the invention thereto.

[Production Example 1] Production of Aqueous Magnesium Citrate Solution

Citric acid monohydrate (product of Kanto Chemical Co., Inc., special grade, 99.5 mass %) (253.5 g) was dissolved in pure water (2,058.8 g), to thereby prepare 10.0 mass % aqueous citric acid solution. While the thus-prepared aqueous citric acid solution was stirred, magnesium hydroxide (product of Kanto Chemical Co., Inc., primary grade, 95.0%) (105.7 g) was added thereto. The mixture was stirred at room temperature for one hour, to thereby yield an aqueous magnesium citrate solution. The solid concentration (as reduced to MgO) of the aqueous magnesium citrate solution was 2.9 mass %.

[Production Example 2] Production of Aqueous Magnesium Glycolate Solution

Glycolic acid (product of Tokyo Chemical Industry Co., Ltd., 98.0 mass %) (15.2 g) was dissolved in pure water (113.4 g), to thereby prepare 11.6 mass % aqueous glycolic acid solution. While the thus-prepared aqueous glycolic acid solution was stirred, magnesium hydroxide (product of Kanto Chemical Co., Inc., primary grade, 95.0 mass %) (5.8 g) was added thereto. The mixture was stirred at room temperature for one hour, to thereby yield an aqueous magnesium glycolate solution. The solid concentration (as reduced to MgO) of the aqueous magnesium citrate solution was 3.0 mass %.

Example 1

Pure water (1,196.1 g) was added to colloidal silica (SNOWTEX (registered trademark) OXS, product of Nissan Chemical Industries, Ltd., silica concentration: 10.6 mass %, primary particle size as determined through electron microscopy: 5 nm) (283.4 g), to thereby prepare a mixture, and the aqueous magnesium citrate solution produced in Production Example 1 (1,334.8 g) was added to the mixture, followed by mixing at room temperature for 30 minutes. The thus-obtained liquid mixture was found to have a specific gravity of 1.04, a viscosity of 1.8 mPa·s, and a pH of 5.2. The liquid mixture (2,500 g) was dried by means of a spray drier (Pulvis Mini Spray GA-22, product of Yamato Scientific Co., Ltd.) under the following conditions: inlet temperature 180° C., atomizing air pressure 1.35 kgf/cm$^2$, aspirator flow 0.30 m$^3$/min, and liquid mixture feed rate 5 g/min. The outlet temperature was 80±2° C., and 99.6 g of white dry powder was yielded. The thus-obtained dry powder (43.1 g) was placed in a crucible, and fired for 2 hours in air at 500° C. by means of an electric furnace. The firing in air was continued further for 2 hours at 800° C., to thereby yield 12.4 g of a white powder. The obtained white powder was characterized by X-ray diffractometry. As a result, the formed phase was found to be substantially formed of a single forsterite phase. The specific surface area of the product, as determined through the nitrogen adsorption method, was 18.4 m$^2$/g. FIG. 1 shows a relevant X-ray diffraction chart. Through observation under a transmitting electron microscopy, the primary particle size was determined as 30 to 50 nm. FIG. 2 shows the relevant TEM image thereof.

Example 2

Pure water (337.3 g) was added to colloidal silica (SNOWTEX (registered trademark) OXS, product of Nissan Chemical Industries, Ltd., silica concentration: 10.6 mass %, primary particle size as determined through electron microscopy: 5 nm) (28.3 g), to thereby prepare a mixture, and the aqueous magnesium glycolate solution produced in Production Example 2 (134.4 g) was added to the mixture, followed by mixing at room temperature for 30 minutes. The thus-obtained liquid mixture was found to have a specific gravity of 1.02, a viscosity of 1.8 mPa·s, and a pH of 5.3. The liquid mixture (500 g) was dried by means of a spray drier (Pulvis Mini Spray GA-22, product of Yamato Scientific Co., Ltd.) under the following conditions: inlet temperature 180° C., atomizing air pressure 1.35 kgf/cm$^2$, aspirator flow 0.30 m$^3$/min, and liquid mixture feed rate 5 g/min. The outlet temperature was 80±2° C., and 11.1 g of white dry powder was yielded. The thus-obtained dry powder (2.0 g) was placed in a crucible, and fired for 2 hours in air at 500° C. by means of an electric furnace. The firing in air was continued further for 2 hours at 800° C., to thereby yield 0.5 g of a white powder. The obtained white powder was characterized by X-ray diffractometry. As a result, the formed phase was found to be substantially formed of a single forsterite phase. The specific surface area of the product, as determined through the nitrogen adsorption method, was 18.1 m$^2$/g. Through observation under a transmitting electron microscopy, the primary particle size was determined as 30 to 50 nm.

Comparative Example 1

Pure water (119.6 g) was added to colloidal silica (SNOWTEX (registered trademark) OXS, product of Nissan Chemical Industries, Ltd., silica concentration: 10.6 mass %, primary particle size as determined through electron microscopy: 5 nm) (28.3 g), to thereby prepare a mixture, and the aqueous magnesium citrate solution produced in Production Example 1 (133.5 g) was added to the mixture, followed by mixing at room temperature for 30 minutes. The thus-obtained liquid mixture was found to have a specific gravity of 1.04, a viscosity of 1.8 mPa·s, and a pH of 5.2. The liquid mixture (281.4 g) was transferred to a petri dish and dried by means of a hot-blow heater at 80° C. for 12 hours, 22.4 g of white dry powder was yielded. The thus-obtained dry powder (5.0 g) was placed in a crucible, and fired for 2 hours in air at 500° C. by means of an electric furnace. The firing in air was continued further for 2 hours at 800° C., to thereby yield 0.5 g of a white powder. The thus-obtained powder was characterized by X-ray diffractometry. As a result, the formed phase was found to be a mixed phase of forsterite, magnesium oxide, and enstatite.

Comparative Example 2

Pure water (247.1 g) was added to colloidal silica (SNOWTEX (registered trademark) OXS, product of Nissan Chemical Industries, Ltd., silica concentration: 10.6 mass %, primary particle size as determined through electron microscopy: 5 nm) (28.3 g), to thereby prepare a mixture, and magnesium hydroxide (product of Kanto Chemical Co., Inc., primary grade, 95.0 mass %) (5.8 g) was added to the mixture, followed by mixing at room temperature for 30 minutes. The solubility of magnesium hydroxide in water at 20° C. is 0.001 mass %. The thus-obtained liquid mixture was found to have a specific gravity of 1.04, a viscosity of 1.9 mPa·s, and a pH of 9.5. The liquid mixture was dried by means of a spray drier (Pulvis Mini Spray GA-22, product of Yamato Scientific Co., Ltd.) under the following conditions: inlet temperature 180° C., atomizing air pressure 1.35 kgf/cm$^2$, aspirator flow 0.30 m$^3$/min, and liquid mixture feed rate 5 g/min. The outlet temperature was 80±2° C., and 4.8 g of white dry powder was yielded. The thus-obtained dry powder (1.0 g) was placed in a crucible, and fired for 2 hours in air at 500° C. by means of an electric furnace. The firing in air was continued further for 2 hours at 800° C., to thereby yield 0.7 g of a white powder. The thus-obtained powder was characterized by X-ray diffractometry. As a result, the formed phase was found to be a mixed phase of magnesium oxide and an amorphous substance.

Total Light Transmittance Measurement

Test Example 1

Forsterite microparticles (1 g), prepared in the same manner as employed in Example 1, and isopropanol (9 g) were placed in a glass bottle (capacity: 20 mL), and the mixture was subjected to ultrasonication for 10 minutes, to thereby yield a forsterite microparticle slurry. The thus-obtained forsterite microparticle slurry was applied onto a glass plate by means of an applicator (25 μm) and dried at 100° C. for 10 minutes, to thereby form a coating film containing forsterite microparticles. The total light transmittance (Tt) of the formed coating film was 95%, as determined by means of a spectro-haze meter (NDH 5000, product of Nippon Denshoku Industries Co., Ltd.).

Test Example 2

The procedure of Test Example 1 was repeated, except that HFF-SO (product of Marusu Glaze Co., Ltd., specific surface area (nitrogen adsorption: 8.7 m$^2$/g) was used as a forsterite microparticle product, to thereby yield a forsterite microparticle slurry. The thus-obtained forsterite microparticle slurry was applied onto a glass plate by means of an applicator (25 μm) and dried at 100° C. for 10 minutes, to thereby form a coating film containing forsterite microparticles. The total light transmittance (Tt) of the formed coating film was 86%, as determined by means of a spectro-haze meter (NDH 5000, product of Nippon Denshoku Industries Co., Ltd.).

The invention claimed is:

1. A method for producing forsterite microparticles having a primary particle size of 1 to 200 nm, as determined through electron microscopy, the method comprising:

spray-drying, in an atmosphere at 50° C. or higher and lower than 300° C., a solution formed by mixing a water-soluble magnesium salt and colloidal silica in water at a mole ratio of magnesium atoms to silicon atoms (Mg/Si) of 2; and subsequently, firing the spray-dried product in air at 800 to 1,000° C.; wherein the method does not include a pulverization step during or after the firing step.

2. The method according to claim 1, wherein the colloidal silica has a primary particle size of 2 to 100 nm, as determined through electron microscopy.

3. The method according to claim 1, wherein the water-soluble magnesium salt is an organic acid salt of magnesium.

4. The method according to claim 2, wherein the water-soluble magnesium salt is an organic acid salt of magnesium.

5. The method according to claim 3, wherein the magnesium organic acid salt is at least one species selected from the group consisting of magnesium citrate, magnesium glycolate, magnesium malate, magnesium tartrate, magnesium lactate, magnesium malonate, magnesium succinate, and magnesium acetate.

6. The method according to claim 1, further comprising: preparing the solution by mixing together, in water, the water-soluble magnesium salt and the colloidal silica.

* * * * *